G. SWITZER.
Detaching Horses from Vehicle.
No. 106,293. Patented August 9, 1870.
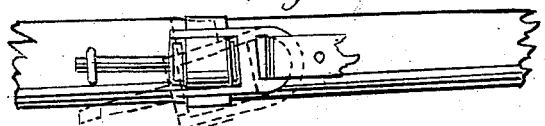
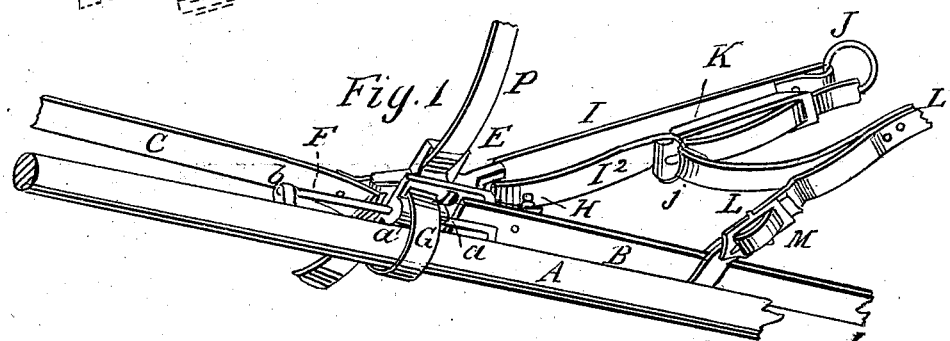
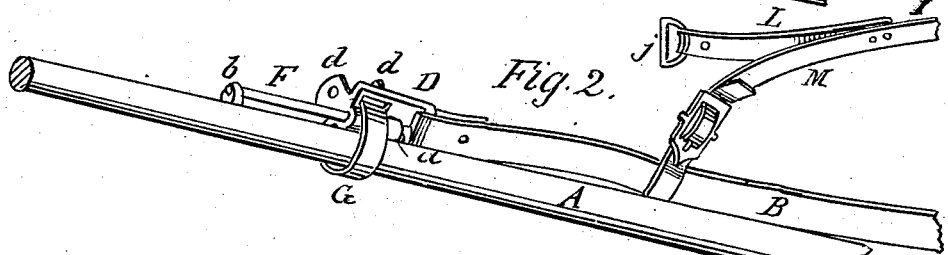
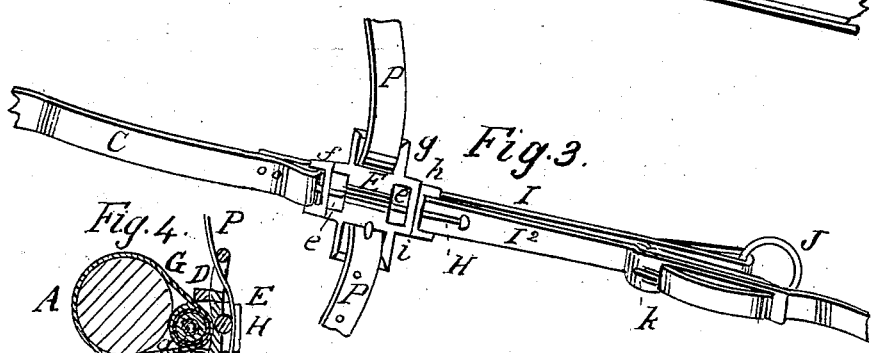
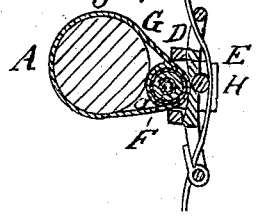
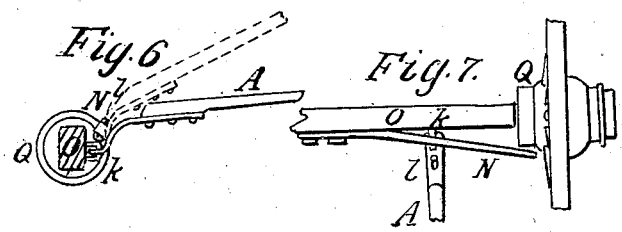
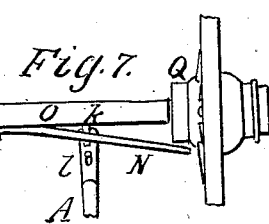
Witnesses
Chas. E. Upperman
P. A. Devine
Inventor
George Switzer
By Upperman Johnson
Attys.

United States Patent Office.

GEORGE SWITZER, OF WASHINGTON, DISTRICT OF COLUMBIA.

Letters Patent No. 106,293, dated August 9, 1870.

IMPROVEMENT IN ATTACHING AND DETACHING HORSES FROM VEHICLES.

The Schedule referred to in these Letters Patent and making part of the same.

*To whom it may concern:*

Be it known that I, GEORGE SWITZER, of the city and county of Washington, in the District of Columbia, have invented certain new and useful Improvement in Devices for Attaching and Detaching Horses from Vehicles; and I do hereby declare that the following is a full, clear, and exact description thereof, reference being had to the accompanying drawing of the same, which makes part of this specification, and in which—

Figure 1 represents a view in perspective of a portion of one of the shafts or thills, and the trace or tug-strap and parts of the harness connected therewith, in the positions they occupy when the horse is secured to the vehicle.

Figure 2 represents a similar view, showing only the parts of the device attached to the shafts, and detachable from the harness of the horse.

Figure 3 represents a similar view of the parts of the harness shown as having been detached from the parts shown in fig. 2.

Figure 4 represents a cross-section of one of the shafts, and the attaching and detaching device of the harness connected thereto.

Figure 5 represents an elevation of the attaching device secured to the shaft.

Figure 6 represents a section of the front axle and a spring brake connected thereto, and operated by elevating the shafts to stop the vehicle when the horse is released.

Figure 7 represents a plan of the same.

In the accompanying drawing—

A represents a part of one of the thills or shafts, to which the harness of the horse is secured.

Each trace or tug-strap is made in two sections; the rear one, B, is secured to the shaft or thill by means of an attaching and detaching device, and to the whiffletree; and the other, C, to the hames of the horse, and to the device by which it is attached to and detached from the shafts.

The attaching and detaching device consists of two plates or castings, D and E, one of which, D, has a hub or projection, $a$, on its back, provided with an opening, through which the stem of a staple, F, passes, and forms the bearing for the said plate D, so as to allow it to have a slight oscillating and longitudinal movement, to accommodate itself to the motion of the whiffletree and the horse's shoulders.

The staple F is secured to the shaft A, so as to allow it to be turned upon its hinged or swiveled end, to be locked and unlocked with a catch, $b$; and for this purpose the catch has a shoulder, and the end of the stem is beveled, and made to interlock with said shoulder by being sprung over it, as shown in figs. 1 and 2, by which the attaching device can be easily removed from the shaft without detaching it from the harness in putting up the team; or, in case the vehicle should be safely stored, it may remain secured to the shaft and single-tree.

The cylindrical opening of the hub $a$ is provided with a leather or rubber bearing, $c$, for the stem of the staple F, to prevent any rattling of the parts.

To guard against any possible accident by which the staple might be freed from its catch, and the attaching device disconnected from the shaft, the hub $a$ may be united to the shaft by a leather loop, G, surrounding them, so that they can only be separated by sliding them off the end of the shaft should the staple become unfastened.

The plate D of the thills is provided, on its side opposite the bearing-hub $a$, with two ears, $d\ d$, which project into and through openings, $e\ e$, in the detachable plate E, and the two plates, D and E, thus interlocked, are secured together by means of a pin, H, passing through openings in the projecting ears $d$, so as to hold the locking-pin H against the inner side of the plate E, in such manner as to render the said locking-pin quickly detachable, to separate the parts, as will be presently more fully described.

The detachable plate E has four branches or loops, $f\ g\ h\ i$, arranged in pairs at right angles to each other, through two of which, $g$ and $i$, the saddle-strap P passes, and is buckled into the lower loop, $i$, as shown in fig. 3, while the front section, C, of the trace-strap, is secured in the front loop, $f$, and to the rear loop, the detaching-strap I I$^2$, which carries the locking-pin.

This strap occupies the place of the ordinary breeching strap, and is, therefore, connected to the breeching-ring J, so that, in withdrawing the locking-pin from the projecting ears $d\ d$ of the plate D, the strap I I$^2$ will not slip through said ring J, but be held by it, and thus furnish a fixed point from which to pull the outer branch, I$^2$, of said strap, rearward, when it is desired to withdraw the locking-pin, which latter must be so arranged in relation to the length of the breeching-strap, the loop $h$, through which said strap passes, and the ears $d\ d$, through which said pin passes, as that, whether pulling by the trace or backing by the breeching, the position or safety of the pin, as a locking device, will not be affected in the least, nor rendered uncertain, because the strain is always equal upon the two branches of the strap, and keeps them taut, except when it is desired to disengage the horse; then the strain is put upon that branch, I$^2$, of the strap which carries the pin, so that, in pulling it rearward, (the breeching-ring serving as the fixed point of pull,) the strap I will be drawn through the loop $h$, and the pin be withdrawn from its locked position. To accomplish this, the pin must extend into the locking-ears $d$ of the device, on a line with that side or branch I² of the strap to which it is attached, as shown in fig. 3, and, as there is nothing to hold the two plates D and E together when the pin has been pulled out, they separate at once, leaving the harness of the horse entirely free from the shafts, as he carries with him the detachable plate E, the front section of the trace, and the breeching-strap of both sides or shafts.

The means for effecting the detachment of the horse consists in securing to that branch of the breeching-straps, I², which carries the pins, near their connection with the breeching-rings, a bill-hooked shaped catch or buckle, K, as shown in figs. 1 and 3, into each of which is hooked a loop, j, secured to the ends of a strap, L, leading to and under the control of the driver. These hooked catches K are constructed and secured to their straps in such manner that their hooked ends will always remain closed with their straps, and thus keep the loops j confined therein; but their form is such as to allow the loops j to pull themselves out of the hooks in giving the strap a sudden, strong pull to withdraw the pin; because, as the driver pulls upon the strap L, the force is communicated directly to the outer branches I² of the breeching-straps, so as to cause the hooked ends of the catches to open as the pins are withdrawn and the loop liberated.

In this action, the hooked buckle serves as a lever, and its position on the strap must be such as to allow it to pull the strap backward a sufficient distance to entirely withdraw the pin from its locked position. In this manner the horse is detached and cleared of the vehicle in case of running away.

In this operation, however, the danger to the occupants of the vehicle is not entirely relieved, because the shafts or thills, being allowed to fall suddenly to the ground while the vehicle is in rapid motion, would not only break them, but endanger the violent upsetting of the carriage, and imperil the lives and limbs of the occupants. To prevent this, a branch-strap, M, of the detaching-strap L, is secured to the rear section B of the trace or shaft, as may be desired, as shown in figs. 1 and 2, so that the same act or pull which releases the horse also elevates the shafts or thills, and puts into action a brake upon the front wheels.

This brake consists of two spring bars, N, secured to the front side of the forward axle O, so as to extend over the rear ends of the hubs Q of the front wheels, and above the hinge k of each shaft.

The latter, having the usual bend, are provided on the upper side with pins or projectings, l, which, when the shafts are raised, as shown by dotted lines in fig. 6, will pass over the spring brake-bars N, and thus lock the shafts with them, so that the upward movement of each shaft is utilized as a lever by which to press, with force, each brake against the hubs of the wheels, and in this way effect the safety of the vehicle and its occupants after the horse or horses are released, and by one and the same movement or pull upon a single strap or rein L within reach of the driver, the two things, viz., the detachment of the horse and the stopping of the carriage, constituting one and the same operation.

There are many advantages in the use of this method of attaching and detaching horses from the shafts, whether in case of a runaway, or for taking out the horse and putting up the carriage, for, by the method now practiced, there are eleven things to be done to fasten or hitch a horse to a carriage after the harness is on the horse, and the same number of things to be done to undo and take a horse out of the shafts.

By my method, but two things only are required to be done, viz., to withdraw the locking-pins from the detachable plates of each shaft; and even these two things may be done simultaneously, by pulling one strap before the driver gets out of the carriage, and the horse is unhitched by one motion, and ready for the stable.

The position of the attaching and detaching-plates may be on the inside, above or beneath the shafts.

The shafts may also be made short, and the devices secured directly to their ends.

The staples F may be provided with springs, so as to render the pull of the front sections of the traces easy upon the horse's shoulders; and, if at any time it should be found desirable to enable me to dispense with the rear sections B of the traces, and the single-tree, and let the horse draw direct from the front traces and shafts, the plates D, in such case, will pull directly against these springs, which may be made of rubber or rubber and wire combined.

Having described my invention,

I claim—

1. The method herein described of attaching and detaching horses from vehicles by means of the traces or tug-straps, made in two sections, B and C, the front ones, C, secured to and carried by a detachable plate, E, and the breeching-straps I, and the rear ones, B, by an armed plate, D, secured to the shafts, the two plates constructed so as to interlock with each other, and be locked and unlocked from each other by means of attaching and detaching-pins H, carried by the breeching-straps, and controlled by a single strap within reach of the driver, substantially as herein described.

2. The combination of the detachable plate E with the plate D and staple F, substantially as herein described.

3. The breeching-straps I², constructed with attaching and detaching-pins H, in combination with the interlocking-plates D and E, substantially as herein described.

4. The breeching-straps I², constructed with hooks K, in combination with a detaching-strap, M, and the locking and unlocking pins H, substantially as herein described.

5. The staples F, which carry the interlocking-plates D, constructed so as to be unfastened from the shafts, to allow the said plates, with their straps, to be removed from the shafts when desired, substantially as herein described.

6. The hubs a, as described, of the interlocking-plates E, provided with interior bearings, c, of leather or rubber, to prevent the rattling of the parts, substantially as herein described.

7. The strap L, attached to the traces or shafts, for the purpose of elevating the shafts, to bring into action spring brakes N, to stop the vehicle by the same pull and by the same strap which effects the release of the horse, substantially as herein described.

8. The combination of the interlocking-plates D and E, the staple F, the trace-straps B and C, breeching-straps I I², hooked buckle K, and detaching-strap L, the several parts being constructed, arranged, and operating substantially as herein described.

9. In the above-described detaching apparatus, the strap L, as arranged, and operating in such manner as to lift and hold up the shafts when the horse is released, substantially as herein described.

In testimony whereof I have hereunto signed my name.

GEORGE SWITZER.

Witnesses:
A. E. H. JOHNSON,
T. H. UPPERMAN.